(12) United States Patent
Johnston et al.

(10) Patent No.: US 8,517,078 B1
(45) Date of Patent: **\*Aug. 27, 2013**

(54) ULTRASONIC WELDING ASSEMBLY AND METHOD OF ATTACHING AN ANVIL TO A BRACKET OF THE ASSEMBLY

(75) Inventors: Bruce Johnston, Redford, MI (US); Kwok Tom, Madison Heights, MI (US)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/556,411

(22) Filed: Jul. 24, 2012

(51) Int. Cl.
*B32B 37/00* (2006.01)

(52) U.S. Cl.
USPC ..................... 156/580.2; 156/580.1

(58) Field of Classification Search
USPC .................. 156/73.1, 580.1, 580.2; 228/1.1, 228/110.1; 425/174.2; 310/323.01, 323.18
See application file for complete search history.

(56) References Cited

U.S. PATENT DOCUMENTS

| | | | |
|---|---|---|---|
| 3,140,859 A | 7/1964 | Scarpa | |
| 4,294,392 A | 10/1981 | Colloff | |
| 4,767,492 A * | 8/1988 | Fukusima et al. | 156/580.2 |
| 5,357,423 A | 10/1994 | Weaver et al. | |
| 5,371,337 A | 12/1994 | Campbell et al. | |
| 6,150,753 A | 11/2000 | Decastro | |
| 8,177,878 B2 | 5/2012 | Heinrich et al. | |
| 2007/0257087 A1 | 11/2007 | Klinstein et al. | |
| 2009/0111015 A1 | 4/2009 | Wood et al. | |
| 2009/0297892 A1 | 12/2009 | Ijaz et al. | |
| 2009/0297942 A1 | 12/2009 | Jang et al. | |
| 2010/0038409 A1 | 2/2010 | Wilden et al. | |
| 2011/0114705 A1 | 5/2011 | Matis | |
| 2011/0117420 A1 | 5/2011 | Kim et al. | |
| 2011/0284169 A1 | 11/2011 | Khakhalev | |
| 2011/0287300 A1 | 11/2011 | Byun et al. | |
| 2011/0293992 A1 | 12/2011 | Hsu et al. | |
| 2011/0300438 A1 | 12/2011 | Khakhalev | |
| 2012/0052364 A1 | 3/2012 | Khakhalev | |
| 2012/0111924 A1 | 5/2012 | Makita et al. | |
| 2012/0153006 A1 | 6/2012 | Koetting et al. | |
| 2012/0158168 A1 | 6/2012 | Khakhalev | |
| 2012/0180929 A1 | 7/2012 | Koetting et al. | |

FOREIGN PATENT DOCUMENTS

| | | |
|---|---|---|
| JP | 2005503265 A | 2/2005 |
| JP | 2006212692 A | 8/2006 |
| JP | 2007009169 A | 1/2007 |

OTHER PUBLICATIONS

International Search Report for International Application No. PCT/KR2011/003497 dated Jan. 9, 2012.
U.S. Appl. No. 13/213,416, filed Aug. 9, 2011 entitled "Ultrasonic Welding Machine and Method of Aligning an Ultrasonic Welding Horn Relative to an Anvil".
U.S. Appl. No. 13/222,601, filed Aug. 31, 2011 entitled "Ultrasonic Welding Machine and Method of Assembling the Ultrasonic Welding Machine".

\* cited by examiner

*Primary Examiner* — James Sells
(74) *Attorney, Agent, or Firm* — Buckert Patent & Trademark Law Firm, P.C

(57) ABSTRACT

An ultrasonic welding assembly having an ultrasonic horn and an anvil having first, second, and third plate portions is provided. The third plate portion is coupled between the first and second plate portions. The first plate portion has a first knurled region on a first side disposed proximate to the ultrasonic horn, and the second plate portion has a second knurled region on the first side. The third plate portion has a first aperture extending therethrough. The assembly further includes a bracket that receives the second side of the anvil for holding the anvil thereon. The bracket has a second aperture extending therethrough that aligns with the first aperture, such that a coupling member extending through the first and second apertures removably couples the anvil to the bracket.

5 Claims, 6 Drawing Sheets

ULTRASONIC WELDING ASSEMBLY AND METHOD OF ATTACHING AN ANVIL TO A BRACKET OF THE ASSEMBLY

BACKGROUND

Ultrasonic welding devices have been utilized. However, when a contact portion of an ultrasonic welding anvil becomes degraded, the anvil is thrown away and a new welding anvil is utilized. A problem with this approach is that the ultrasonic welding anvils are relatively expensive.

Accordingly, the inventors herein have recognized a need for an improved ultrasonic welding assembly and method that reduces the above mentioned deficiency.

SUMMARY

An ultrasonic welding assembly in accordance with an exemplary embodiment is provided. The ultrasonic welding assembly includes an ultrasonic horn and an anvil. The anvil has first, second, and third plate portions. The first and second plate portions extend generally perpendicular to one another. The third plate portion is coupled between the first and second plate portions. The first, second, and third plate portions define first and second sides. The first plate portion has a first knurled region on the first side disposed proximate to the ultrasonic horn. The second plate portion has a second knurled region on the first side. The third plate portion has a first aperture extending therethrough. The ultrasonic welding assembly further includes a bracket configured to receive the second side of the anvil for holding the anvil thereon. The bracket has a second aperture extending therethrough that aligns with the first aperture, such that a coupling member extending through the first and second apertures removably couples the anvil to the bracket.

A method for attaching an anvil to a bracket of an ultrasonic welding assembly in accordance with another exemplary embodiment is provided. The anvil has first, second, and third plate portions. The first and second plate portions extend generally perpendicular to one another. The third plate portion is coupled between the first and second plate portions. The first, second, and third plate portions define first and second sides. The first plate portion has a first knurled region on the first side. The second plate portion has a second knurled region on the first side. The third plate portion has a first aperture extending therethrough. The method includes disposing the second side of the anvil against a portion of the bracket such that the first aperture aligns with a second aperture in the bracket, and a portion of the second plate portion is received in a notch of the bracket, and the first knurled region is configured to be disposed proximate to an ultrasonic horn. The method further includes disposing a coupling member through the first and second apertures to fixedly couple the anvil to the bracket. The method further includes when the first knurled region has a degraded configuration, removing the coupling member from the first and second apertures to remove the anvil from the bracket. The method further includes disposing the second side of the anvil against the portion of the bracket such that first aperture aligns with a second aperture in the bracket, and a portion of the first plate portion is received in the notch of the bracket, and the second knurled region is configured to be disposed proximate to the ultrasonic horn. The method further includes disposing the coupling member through the first and second apertures to fixedly couple the anvil to the bracket.

DETAILED DESCRIPTION

Figure 1:
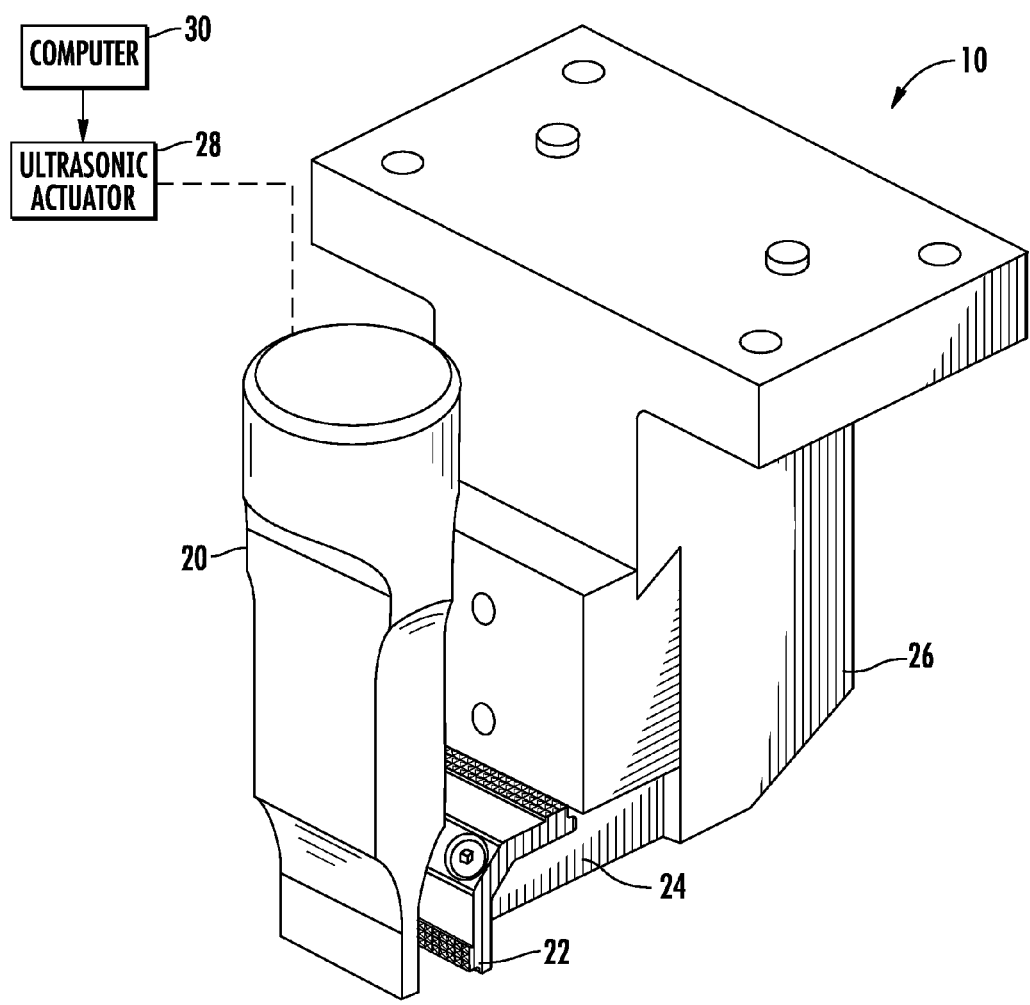
FIG. 1 is a schematic of a ultrasonic welding assembly in accordance with an exemplary embodiment.
Figure 2:
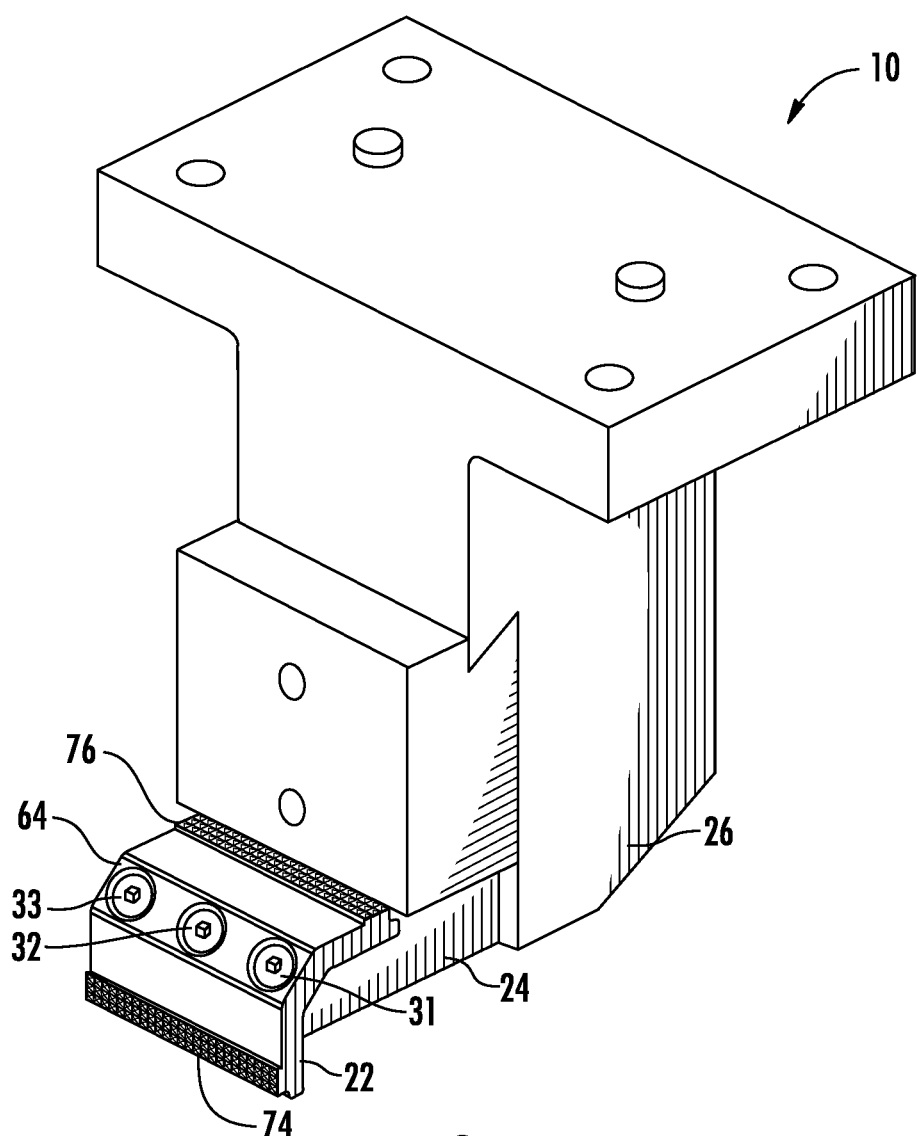
FIG. 2 is a schematic of a portion of the ultrasonic welding assembly of FIG. 1.

Referring to the FIGS. 1-5, schematics of an ultrasonic welding assembly 10 in accordance with an exemplary embodiment are illustrated. The ultrasonic welding assembly 10 includes an ultrasonic horn 20, an anvil 22, a bracket 24, a bracket 26, an ultrasonic actuator 28, a computer 30, and bolts 31, 32, 33. The ultrasonic welding assembly 10 is configured to ultrasonically weld work pieces together that are disposed between the ultrasonic horn 20 and the anvil 22.

Figure 3:
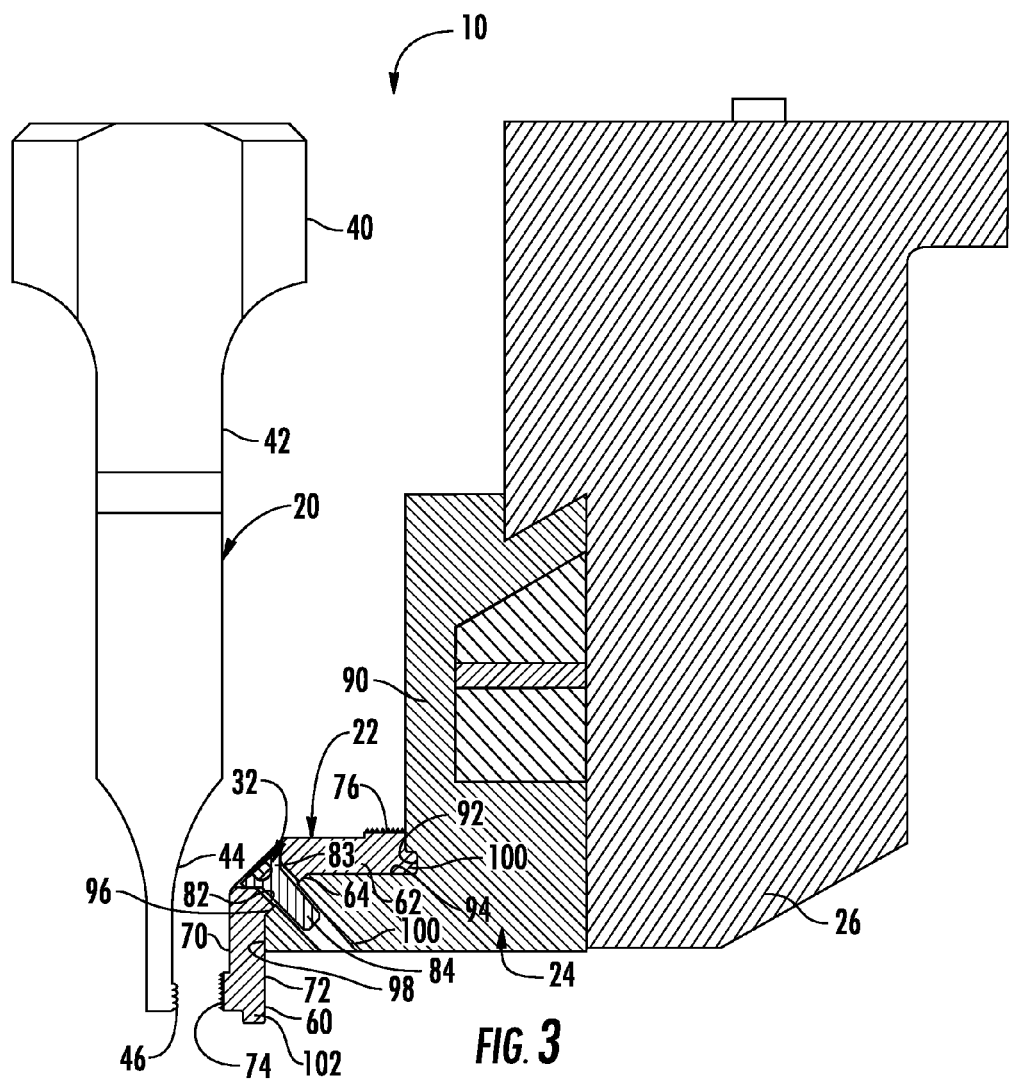
FIG. 3 is a cross-sectional view of the ultrasonic welding assembly of FIG. 1.
Figure 4:
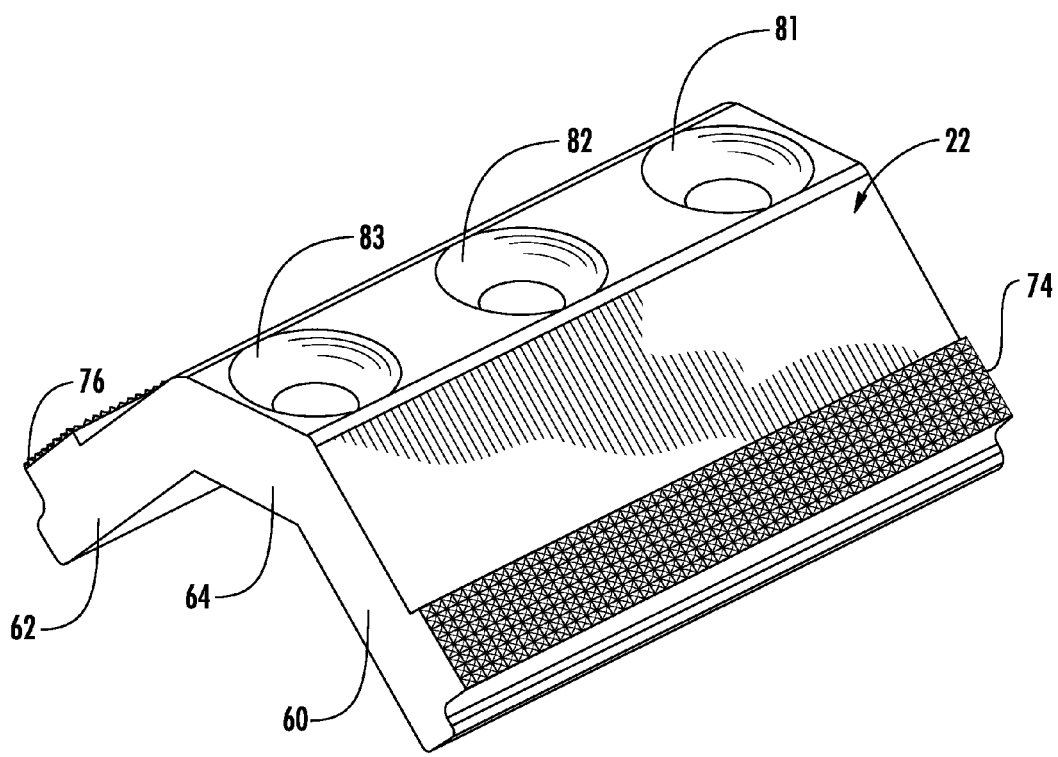
FIG. 4 is an enlarged view of an anvil utilizing in the ultrasonic welding assembly of FIG. 1.
Figure 5:
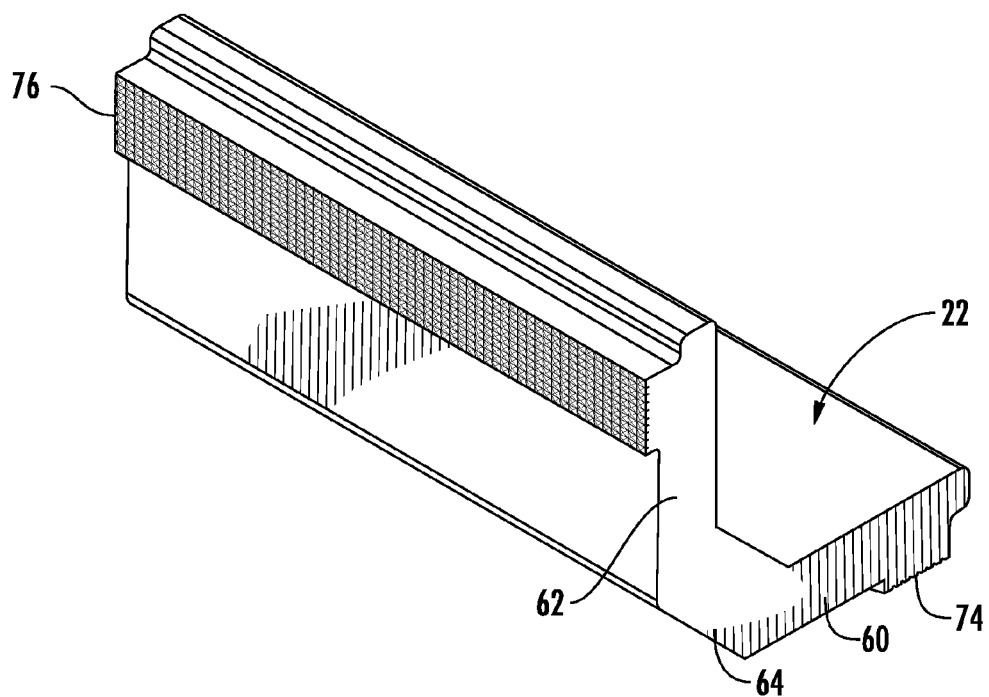
FIG. 5 is another enlarged view of the anvil utilizing in the ultrasonic welding assembly of FIG. 1.

Referring to FIGS. 1 and 3, the ultrasonic horn 20 is operably coupled to an ultrasonic actuator 28. The ultrasonic actuator 22 is configured to vibrate the ultrasonic horn 20 when the ultrasonic actuator 28 receives a control signal from the computer 30. The ultrasonic horn 20 includes a head portion 40, a central portion 42, and a tip portion 44. The head portion 40 is operably coupled to the ultrasonic actuator 28. The central portion 42 is coupled between the head portion 40 and the tip portion 44. The tip portion 44 includes a knurled region 46 that faces a knurled region 74 of the anvil 22. In one exemplary embodiment, the ultrasonic horn 20 is constructed of tool steel such as M2 steel for example.

Referring to FIGS. 2-5, the anvil 22 is configured to hold work pieces (not shown) against the knurled region 46 of the tip portion 44 of the ultrasonic horn 20 for ultrasonically welding the work pieces together. The anvil 22 includes plate portions 60, 62, 64. The plate portions 60, 62 extend generally perpendicular to one another. The plate portion 64 is coupled between the plate portions 60, 62. The plate portion 60, 62, 64 define sides 70, 72. The plate portion 60 includes the knurled region 74 on the side 70 that is disposed proximate to the ultrasonic horn 20. The plate portion 62 has a knurled region 76 on the side 70. The plate portion 64 has apertures 81, 82, 83 (shown in FIG. 4) extending therethrough. The apertures 81, 82, 83 may be threaded for receiving corresponding threads of bolts 31, 32, 33, respectively, therein. In one exemplary embodiment, the anvil 22 is constructed of M2 steel. Of course, in alternative embodiments, the anvil 22 could be constructed of other materials known to those skilled in the art. In the illustrated exemplary embodiment, the anvil 22 is removably coupled to the bracket 24 utilizing the bolts 31, 32, 33. The structure of the bolts 31, 32, 33 have an identical structure so only the structure of the bolt 32 will be explained in greater detail. The bolt 32 has a tapered head portion 83 (shown in FIG. 3) and a threaded portion 84. The threaded portion 84 is received through the aperture 82 of the anvil 22 and the threaded aperture 100 of the bracket 24. An advantage of the anvil 22 is that when the knurled region 74 has been wore down due to usage, the anvil 22 can be detached from the bracket 24 and then rotated and reattached to the bracket 24 such that the knurled region 76 is utilized, for ultrasonic welding. Accordingly, the anvil 22 provides at least twice the operational life as compared to other anvils.

Referring to FIG. 3, the bracket 24 is configured to receive the anvil 22 thereon. The bracket 24 includes a body portion 90 defining a notch 92 extending therein and surfaces 94, 96, 98 for receiving the anvil 22 thereon. The bracket 24 further includes a threaded aperture 100 extending therein for receiving a threaded portion of the bolt 32 therein, and two additional apertures (not shown) for receiving threaded portions of the bolts 31, 33 therein. In the illustrated embodiment, the bracket 24 is constructed of steel.

The bracket 26 is configured to support the bracket 24. In one exemplary embodiment, the bracket 26 is coupled to the bracket 24 utilizing one or more bolts. Further, the bracket 26 is constructed of steel.

Figure 6:
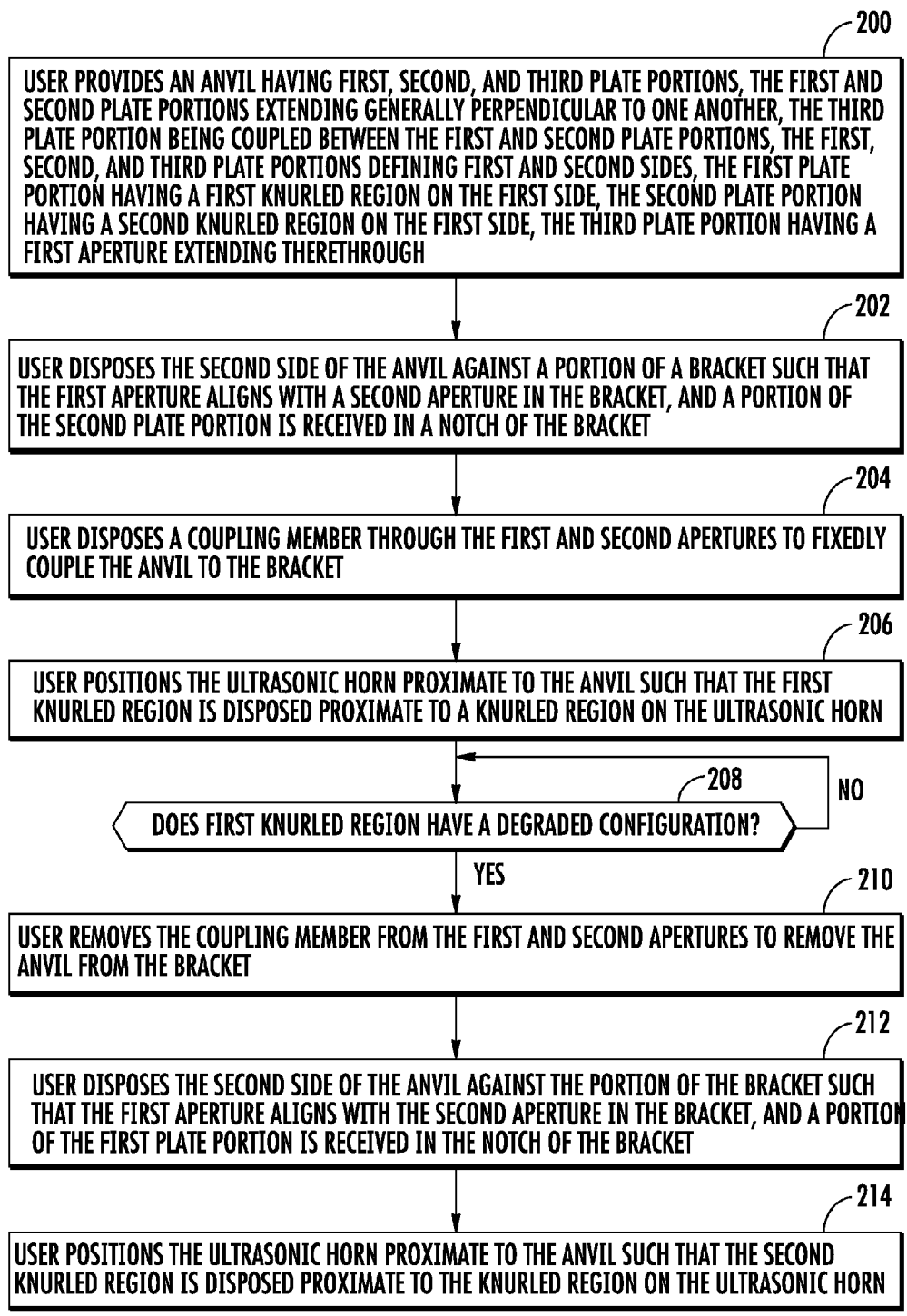
FIG. 6 is a flowchart of a method for attaching an anvil to a bracket of the ultrasonic welding assembly of FIG. 1 in accordance with another exemplary embodiment.

Referring to FIG. 6, a flowchart of a method for attaching the anvil 22 to the bracket 24 of the ultrasonic welding assembly 10 will now be explained. For purposes of simplicity, only the bolt 32 will be discussed in attaching the anvil 22 to the bracket 24. Of course, the bolts 31, 33 could also be utilized to attach the anvil 22 to the bracket 24.

At step 200, a user provides the anvil 22 having plate portions 60, 62, 64. The plate portions 60, 62 extend generally perpendicular to one another. The plate portion 64 is coupled between the plate portions 60, 62. The plate portions 60, 62, 64 define sides 70, 72. The plate portion 60 has the knurled region 74 on the side 70. The plate portion 62 has the knurled region 76 on the side 70. The plate portion 64 has an aperture 82 extending therethrough.

At step 202, the user disposes the side 72 of the anvil 22 against a portion of the bracket 24 such that the aperture 82 aligns with the aperture 100 in the bracket 24, and a portion 100 of the plate portion 62 is received in the notch 92 of the bracket 24.

At step 204, the user disposes the coupling member 32 through the apertures 82, 100 to fixedly couple the anvil 22 to the bracket 24.

At step 206, the user positions the ultrasonic horn 20 proximate to the anvil 22 such that the knurled region 74 is disposed proximate to the knurled region 46 on the ultrasonic horn 20.

At step 208, the user makes a determination as to whether the knurled region 74 as a degraded configuration after welding usage of the anvil 22. If the value of step 208 equals "yes", the method advances to step 210. Otherwise, the method returns to step 208.

At step 210, the user removes the coupling member 32 from the apertures 82, 100 to remove the anvil 22 from the bracket 24.

At step 212, the user disposes the side 72 of the anvil 22 against the portion of the bracket 24 such that aperture 82 aligns with an aperture 100 in the bracket 24, and a portion 102 of the plate portion 60 is received in the notch 92 of the bracket 24.

At step 214, the user positions the ultrasonic horn 20 proximate to the anvil 22 such that the knurled region 76 is disposed proximate to the knurled region 46 on the ultrasonic horn 20.

The ultrasonic welding assembly 10 disclosed herein provides a substantial advantage over other devices. In particular, the ultrasonic welding assembly 10 utilizes an anvil 22 having three plate portions for easily positioning the anvil 22 on a bracket and two knurled regions disposed a side of the anvil to obtain twice the operational life of the anvil 22.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. An ultrasonic welding assembly, comprising:
    an ultrasonic horn;
    an anvil having first, second, and third plate portions, the first and second plate portions extending generally perpendicular to one another, the third plate portion being coupled between the first and second plate portions, the first, second, and third plate portions defining first and second sides, the first plate portion having a first knurled region on the first side disposed proximate to the ultrasonic horn, the second plate portion having a second knurled region on the first side, the third plate portion having a first aperture extending therethrough; and
    a bracket configured to receive the second side of the anvil for holding the anvil thereon, the bracket having a second aperture extending therethrough that aligns with the first aperture, such that a coupling member extending through the first and second apertures removably couples the anvil to the bracket.

2. The ultrasonic welding assembly of claim 1, wherein the ultrasonic horn has a third knurled region disposed proximate to the first knurled region.

3. The ultrasonic welding assembly of claim 2, wherein the anvil is configured to be removed from the bracket and reattached to the bracket such that the second knurled region of the anvil is disposed proximate to the third knurled region of the ultrasonic horn.

4. The ultrasonic welding assembly of claim 1, wherein the holding bracket has a notch extending therein that is configured to receive a portion of the second plate portion therein.

5. The ultrasonic welding assembly of claim 1, wherein the coupling member is a bolt.

* * * * *